United States Patent
Löw et al.

(10) Patent No.: US 8,566,091 B2
(45) Date of Patent: Oct. 22, 2013

(54) SPEECH RECOGNITION SYSTEM

(75) Inventors: Andreas Löw, Neu-Ulm (DE); Lars König, Ulm (DE); Christian Hillebrecht, Blaustein (DE)

(73) Assignee: Nuance Communications, Inc., Burlington, MA (US)

( * ) Notice: Subject to any disclaimer, the term of this patent is extended or adjusted under 35 U.S.C. 154(b) by 1289 days.

(21) Appl. No.: 11/955,233

(22) Filed: Dec. 12, 2007

(65) Prior Publication Data

US 2009/0012792 A1 Jan. 8, 2009

(30) Foreign Application Priority Data

Dec. 12, 2006 (EP) .................................... 06025726

(51) Int. Cl.
*G10L 15/00* (2013.01)
*G10L 17/00* (2013.01)
*G10L 21/00* (2013.01)
*G10L 25/00* (2013.01)

(52) U.S. Cl.
USPC ........ 704/236; 704/250; 704/270; 704/270.1; 704/275

(58) Field of Classification Search
USPC .................................. 704/236, 250, 270–275
See application file for complete search history.

(56) References Cited

U.S. PATENT DOCUMENTS

| | | | |
|---|---|---|---|
| 5,822,728 A * | 10/1998 | Applebaum et al. | 704/254 |
| 5,848,388 A * | 12/1998 | Power et al. | 704/239 |
| 5,930,336 A * | 7/1999 | Junqua et al. | 379/88.03 |
| 5,953,692 A * | 9/1999 | Siegel | 704/1 |
| 6,094,476 A * | 7/2000 | Hunt et al. | 379/88.04 |
| 6,141,661 A | 10/2000 | Brown et al. | |
| 6,148,286 A * | 11/2000 | Siegel | 704/270 |
| 6,185,535 B1 * | 2/2001 | Hedin et al. | 704/270 |
| 6,208,965 B1 * | 3/2001 | Brown et al. | 704/246 |
| 6,230,132 B1 * | 5/2001 | Class et al. | 704/270 |
| 6,269,153 B1 * | 7/2001 | Carpenter et al. | 379/88.02 |
| 6,338,035 B1 * | 1/2002 | Mori | 704/235 |
| 6,434,524 B1 * | 8/2002 | Weber | 704/257 |
| 6,442,523 B1 * | 8/2002 | Siegel | 704/270 |
| 6,714,631 B1 * | 3/2004 | Martin et al. | 379/88.02 |
| 6,941,268 B2 * | 9/2005 | Porter et al. | 704/270 |
| 6,983,244 B2 * | 1/2006 | Junqua et al. | 704/231 |
| 7,058,573 B1 * | 6/2006 | Murveit et al. | 704/229 |

(Continued)

FOREIGN PATENT DOCUMENTS

| | | |
|---|---|---|
| DE | 102 07 895 A1 | 9/2003 |
| EP | 0 840 289 A2 | 5/1998 |

*Primary Examiner* — Eric Yen
(74) *Attorney, Agent, or Firm* — Sunstein Kann Murphy & Timbers LLP (57) ABSTRACT

A speech recognition system is provided for selecting, via a speech input, an item from a list of items. The speech recognition system detects a first speech input, recognizes the first speech input, compares the recognized first speech input with the list of items and generates a first candidate list of best matching items based on the comparison result. The system then informs the speaker of at least one of the best matching items of the first candidate list for a selection of an item by the speaker. If the intended item is not one of the best matching items presented to the speaker, the system then detects a second speech input, recognizes the second speech input, and generates a second candidate list of best matching items taking into account the comparison result obtained with the first speech input.

17 Claims, 4 Drawing Sheets

(56) References Cited

U.S. PATENT DOCUMENTS

| | | | |
|---|---|---|---|
| 7,181,387 B2* | 2/2007 | Ju et al. | 704/9 |
| 7,386,454 B2* | 6/2008 | Gopinath et al. | 704/270 |
| 7,788,095 B2* | 8/2010 | Wasserblant et al. | 704/251 |
| 8,239,129 B2* | 8/2012 | Shen et al. | 701/400 |
| 8,239,203 B2* | 8/2012 | Stubley et al. | 704/270 |
| 2002/0052742 A1 | 5/2002 | Thrasher et al. | |
| 2002/0143548 A1* | 10/2002 | Korall et al. | 704/270 |
| 2003/0154075 A1* | 8/2003 | Schalk et al. | 704/231 |
| 2004/0024601 A1* | 2/2004 | Gopinath et al. | 704/270 |
| 2004/0078201 A1* | 4/2004 | Porter et al. | 704/275 |
| 2005/0261901 A1* | 11/2005 | Davis et al. | 704/235 |
| 2006/0143007 A1* | 6/2006 | Koh et al. | 704/243 |
| 2007/0136048 A1* | 6/2007 | Richardson-Bunbury et al. | 704/9 |
| 2008/0077409 A1* | 3/2008 | Sannerud | 704/277 |
| 2009/0125497 A1* | 5/2009 | Jiang et al. | 707/4 |

* cited by examiner

SPEECH RECOGNITION SYSTEM

RELATED APPLICATIONS

This application claims priority of European Patent Application Serial Number 06 025 726.8, filed on Dec. 12, 2006, titled SPEECH RECOGNITION METHOD, which application is incorporated by reference in this application in its entirety.

BACKGROUND OF THE INVENTION

1. Field of the Invention

This invention relates to a speech recognition system for selecting, via a speech input, an item from a list of items.

2. Related Art

In many applications, such as navigation, name dialing or audio/video player control it is necessary to select an item or an entry from a large list of items or entries, such as proper names, addresses or music titles. To enable speech recognition with moderate memory and processor resources, a two-step speech recognition approach is frequently applied. In a first step, a phoneme sequence or string is recognized by a phoneme recognizer. However, the recognition accuracy of phoneme recognition is usually not acceptable and many substitutions, insertions and deletions of phonemes occur. The phoneme string is then compared with a possibly large list of phonetically transcribed items to determine a shorter candidate list of best matching items. The candidate list is then supplied to a speech recognizer as a new vocabulary for the second recognition path. In this second step the most likely entry or entries in the list for the same speech input are determined by matching phonetic acoustic representations of the entries listed in the candidate list to the acoustic input and determining the best matching entries. This approach saves computational resources, since the phoneme recognition performed in the first step is less demanding and the computational expensive second step is performed only with a small subset of the large list of entries. A two-step speech recognition approach as discussed above is known in the art.

In the case of a speech control navigation system, the best matching items, i.e., the names of the cities that correspond to the speech input from the speaker, can then be listed to the speaker for further selection. It may happen that the first speech input was recorded at a very low quality as, by way of example, short-term noise being present in the surrounding of the speaker during the speech output. Accordingly, it may happen that in the list of the displayed names of items, the name of the item initially intended by the speaker is not contained.

The speaker then has the possibility to utter the intended name a second time hoping that this time the speech input will be correctly processed and the correct intended item is listed or directly selected.

A need therefore exists to improve the speech recognition for selecting an item from a list of items, in which the computational effort is minimized.

SUMMARY

A speech recognition system is provides that includes a speech recognition module for recognizing a first speech input. The system further includes a database containing a list of items for comparison against the speech input. The speech recognition module performs the first path of speech recognition based upon the first speech input for determining a string that which best matches the speech input. The system further includes a database containing a list of items for comparison against the speech recognition string determined from the speech input.

A subword unit comparing module is further provided for comparing the recognized first speech input recognized by the speech recognition module with the list items. The subword unit comparing module may match the recognized subword unit strings with the list item subword unit transcriptions, determine the best matching items and generate the first candidate list of best matching items. An information or display unit is also provided to inform the speaker of at least one of the best matching items of the first candidate list for a further selection by the speaker. The information unit is used to present a subgroup of the first candidate list to the user. If none of the presented items fits the user's preferences, the user may again utter a speech command. This second speech input is then recognized by the speech recognition module and a string of subword units for the second speech input may be generated. The subword unit comparing module generates a second candidate list of best matching items on the basis of the first candidate list. The subword unit comparing module can generate the second candidate list by removing the group of best matching items displayed to the user and discarded by the user from the first candidate list. This second candidate list is then compared to the second speech input and a third candidate list is generated.

In an alternative implementation, the database of list items also includes subword unit transcriptions of each item of the large list of items. Additionally, the speech recognition module can be a subword unit speech recognition module recognizing a first string of subword units for the first speech input and recognizing a string of subword units for the second speech input, the comparing module being a subword unit comparing module comparing the recognized string of subword units with subword unit transcriptions of the list of items.

According to another implementation, a score determination unit can be provided for determining a measure of how well the string of subword units for the first and/or second speech input correspond to the subword unit transcriptions of the candidate lists. A comparison unit can also be provided comparing the determined scores to a threshold value and when the determined scores are lower than the threshold value, the subword speech comparison unit may compare the string of subword units for the second speech input to the subword unit transcriptions of the list of items from which the items discarded by the speaker were removed.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
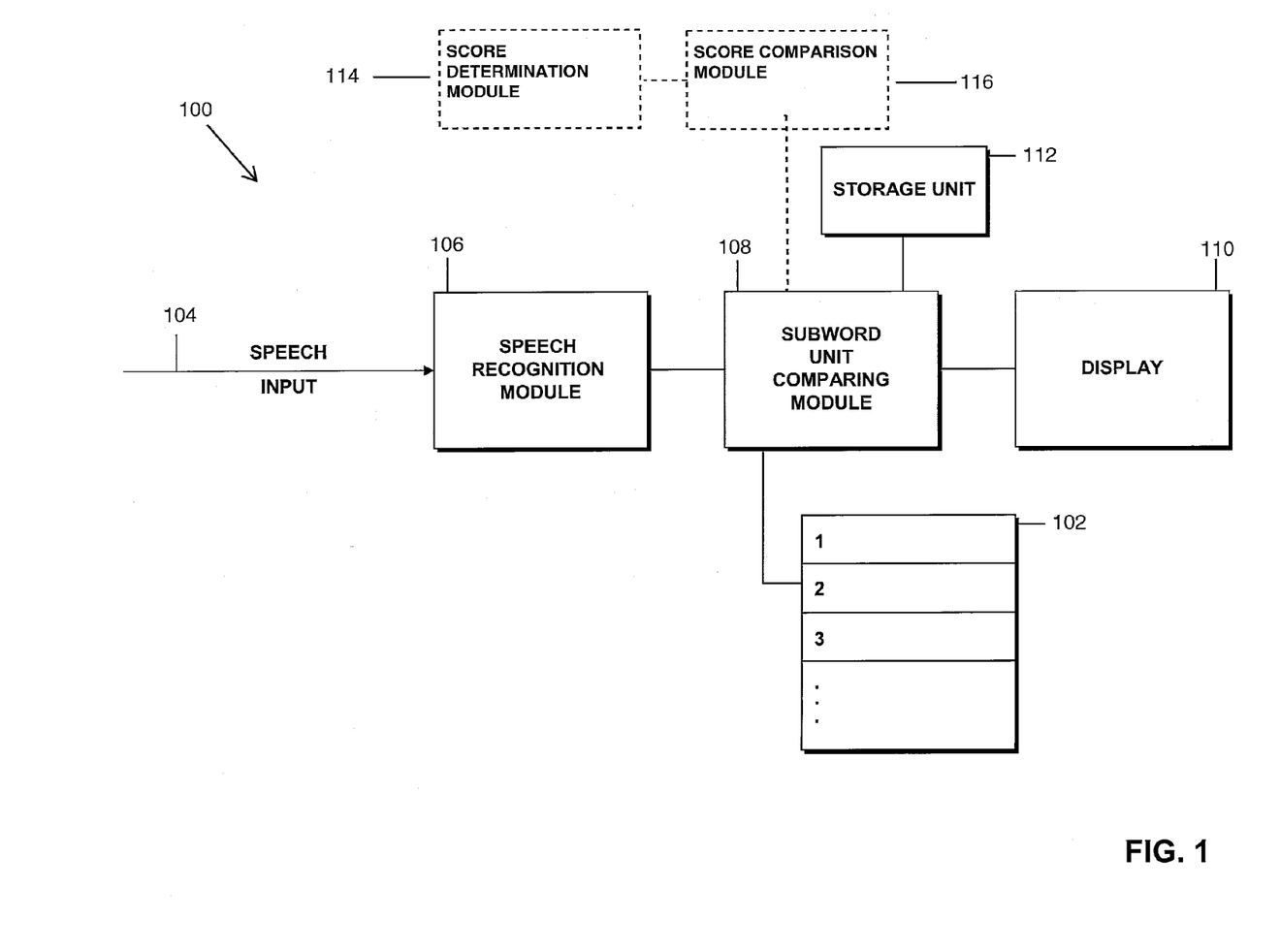
FIG. 1 is a schematic representation of one example of one implementation of a speech recognition system according to the invention.

FIG. 1 is a schematic representation of one example of one implementation of a speech recognition system 100 according to the invention. As illustrated in FIG. 1, a speech input 104 is provided for selecting an item from a database having a list of items 102. In the illustrated system 100, speech input commands 104 are input into a speech recognition module 106, which includes a microphone (not shown) for picking up the speech input 104 command. The speech recognition system 100 further includes a subword unit comparison module 108 that compares a string of subword units generated by the speech recognition module 106 with the subword unit transcriptions of items on the list 102. A display 110 or information unit is also provided for displaying or conveying the top results to the user or speaker. Also as illustrated, a storage unit 112 may also be utilized for storing candidate and recognized lists for reference by the comparing module subword comparing module 108.

By way of example, the system 100 shown in FIG. 1 may be incorporated into a vehicle (not shown) and may, for example, be used in connection with a navigation system. The list of items 102 may include a list of names of possible cities that could serve as a destination location for the vehicle. Additionally, it is also possible that the user of the system 100, i.e. the speaker, utilize the speech recognition system 100 in connection with an audio module (not shown), the user selecting a piece of music by a speech input 104 that includes the name of a song, the artist or a combination of the song and artist.

In operation, the speech recognition module 106 performs a first path of speech recognition for determining a string of subword units for a particular speech input 104 where the string of subword units corresponds to a phoneme, syllable or any other unit of a language. The speech recognition module 106 carries out a phoneme recognition determining a sequence of phonemes that best matches the speech input 104. In the speech recognition module 106, the recognition is not restricted by the vocabulary of the application, be it a navigation system or an audio system, selecting either a destination location or a piece of music, respectively. The speech recognition module 106 applied in this first recognition step normally generates a phoneme sequence that does not perfectly match any phoneme transcription in the list 102. Thus, the generated string of phonemes or string of subword units is then fed to a subword unit comparison module 108 that compares the string of subword units as recognized by the speech recognition module 106 with the subword unit transcriptions of the items on the list 102, the subword unit transcriptions also being stored in the list 102 together with the items.

As a second recognition step, the subword unit comparing module 108 may match the recognized subword unit strings with the list 102 item subword unit transcriptions and determine the best matching items in the list 102 in order to generate a first candidate list for the best matching items. This first candidate list may be obtained by taking a number N of the best matching results. For the generation of the first candidate list, a plurality of the best matching results may be selected. By way of example, the candidate list may include at least several hundreds of items, compared to the list of items 102 that may include tens of thousands of entries. From this first candidate list, a subgroup, i.e., the best or top results, can be displayed to the user so that the user can select one of the displayed items. Now, it might happen that the intended item the user wanted to select is not contained in the items shown on the display 110. Instead of scrolling down the large list of the candidate list, it is also possible to try to use a second speech input by repeating the intended item. In this case, a second speech input is recorded and recognized in the speech recognition module. As will be explained in connection with FIGS. 2-4, a storage unit 112 may be provided in which the first candidate list is stored for further use when the second speech input and the recognized list of subword units for the second speech input is utilized in the subword unit comparing module 108. The candidate lists generated during the recognition steps can also be stored in the storage unit 112.

In an alternative implementation, the database of items 102 may also include the subword unit transcriptions of each item of in the large list of items. Additionally, the speech recognition module may be a subword unit speech recognition module that is capable of recognizing a first string of subword units for a first speech input and recognizing a string of subword units for a second speech input. The subword unit comparing module 108 may be a subword unit comparing module that is able to compare a recognized string of subword units with subword unit transcriptions of the list of items.

According to another implementation, a score determination module or unit 114 may also be provided as part of the speech recognition system 100. The score determination module 114 may form part of the subword unit comparing module 108, or as illustrated in FIG. 1, be a separate module 114 from the subword unit comparing module. The score determination module 114 measures how well the string of subword units for the first and/or second speech input correspond to the subword unit transcriptions of the candidate lists. A score comparison module 116 unit can also be provided separately, or as part of either or both the score determination module 114 or the subword unit comparing module 108, for comparing the determined scores to a threshold value and when the determined scores are lower than the threshold value, the subword speech comparison unit 108 may compare the string of subword units for the second speech input to the subword unit transcriptions of the list of items from which the items discarded by the speaker were removed.

Figure 2:
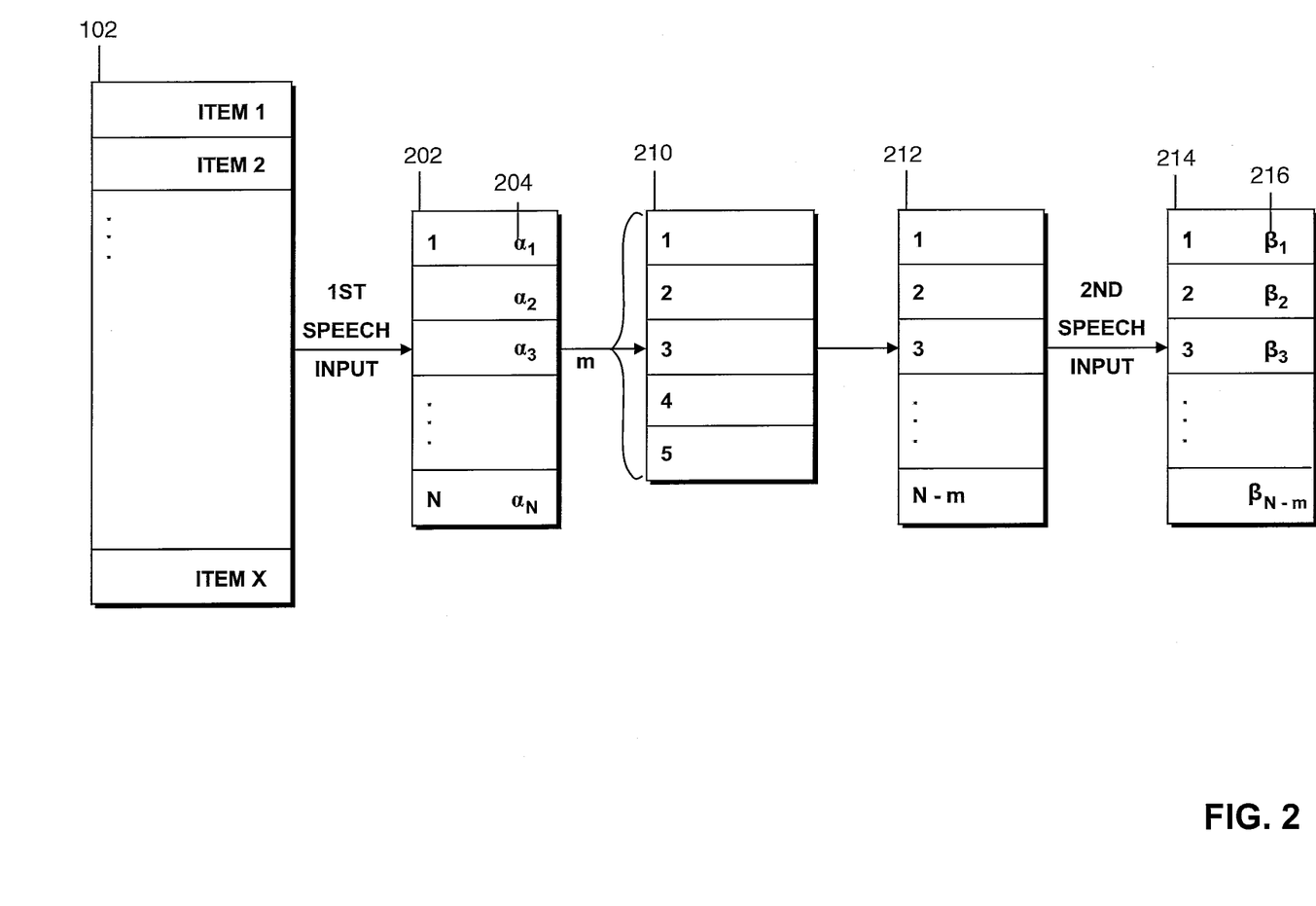
FIG. 2 is a schematic representation of one example of a list of items and different candidate lists that may be utilized during the speech recognition process.

FIG. 2 is a schematic representation of one example of a list of items and different candidate lists that may be utilized during the speech recognition process. In FIG. 2, on the left side the general list of items 102, as also shown in FIG. 1, the list 102 includes a number X of items, X being, for example, in a range between 1000 and 100,000. When the speech input 104 (FIG. 1) is recognized in the speech recognition module 106 (FIG. 1), a first candidate list 202 of best matching items is generated based on the comparison result the first candidate list 202. For generating the first candidate list 202, the matching is not handled very strictly so that the first candidate list 202 also includes the items that do not perfectly match the recognized speech input. The larger the first candidate list 202, the higher the probability is that the intended item is in the candidate list 202. In this context, the first candidate list 202 includes a ranking from the best matching result to the worst matching result. Each of the listed items in the first candidate list 202 includes a measure 204 of how well the recognized string of phonemes corresponds to the transcriptions of the items included in the list 102. In the illustrated example, a high value of the measure 204 a indicates that there is a high similarity between the transcriptions of the items and the generated phonetic transcriptions of the speech input 104. Normally, the first candidate list 202 is selected in such a way that quite a large number of items are selected. For example, the first candidate list 202 may include between 1% and 10% of the large list 102. For comparing the generated string of subword units of the first speech input 104 to the subword unit transcriptions of the items, methods can be utilized that are known in the art, including, for example, a method based on a hidden Markov model (HMM), which utilized a subword unit and a recognition vocabulary or grammar that corresponds to the subword unit transcriptions of the list items 102. In these comparison steps, it is determined to what extend a similarity between an acoustic representation of a list item 102 and the speech input 104 exists. From the first candidate list 202, a subgroup containing the in best matching results can then be displayed to the speaker. In the example shown in FIG. 2, five items 210 are displayed to the user. From the candidate list of the best thousand matches, the first five, by way of example, may then be displayed to the user.

For the determination which of the items on the candidate list 202 is actually the best matching item and for determining the order of appearance or the hierarchy of the items in the candidate list 202, a second speech recognition step can also be utilized in the recognition module. By way of example, the speech recognition module 106 may be an integrated word recognizer that utilizes concatenated subword models for acoustic representation of the list items. The subword unit transcriptions of the candidate lists items serve to define the concatenations of subword units for the speech recognition vocabulary.

If the intended item the speaker wanted to select is not in the list 210 of the items shown, the speaker may decide to use another speech input 104. This second speech input 104 is again input in the speech recognition module 106 for determining a string of subword units for the second speech input. It is now known that the m displayed items did not fit the user's intention. Accordingly, it is possible to discard these m items. In the invention, results obtained in connection with the first speech input are utilized. To do so, a second candidate list 212 is generated corresponding to the first candidate list 210; however, with the m displayed items being removed, Thus, if the first candidate list includes N items, the second candidate list now includes N−m, items.

Instead of comparing the phonetic transcription of the second speech input 104 to the first list 202, the second speech input 104 is now compared to this second candidate list 210 and the list of best matching items 212 is generated based on the comparison result. In the example shown in FIG. 2, a third candidate list is shown by reference numeral 214. In this third candidate list 214, the items indicate the ranked items of the second candidate list 212 again ranked by comprising a measure 216 β, the value β indicating how much the phonetic transcription of the item corresponded to the phonetic transcription of the second speech input. Again, the best m results, for example between 3 and 10, or 4 and 6, can then be displayed to the user hoping that after two speech inputs the correct item could be identified.

As can also be seen from FIG. 2, the computational effort for the recognition of the second speech input and for the selection of the best matching items can be minimized when the second speech input is not compared to the large list 102 including X items, but when the second speech input is only compared to a second candidate list 212 of items that is based on the first candidate list 202, having the already discarded items being removed.

Figure 3:
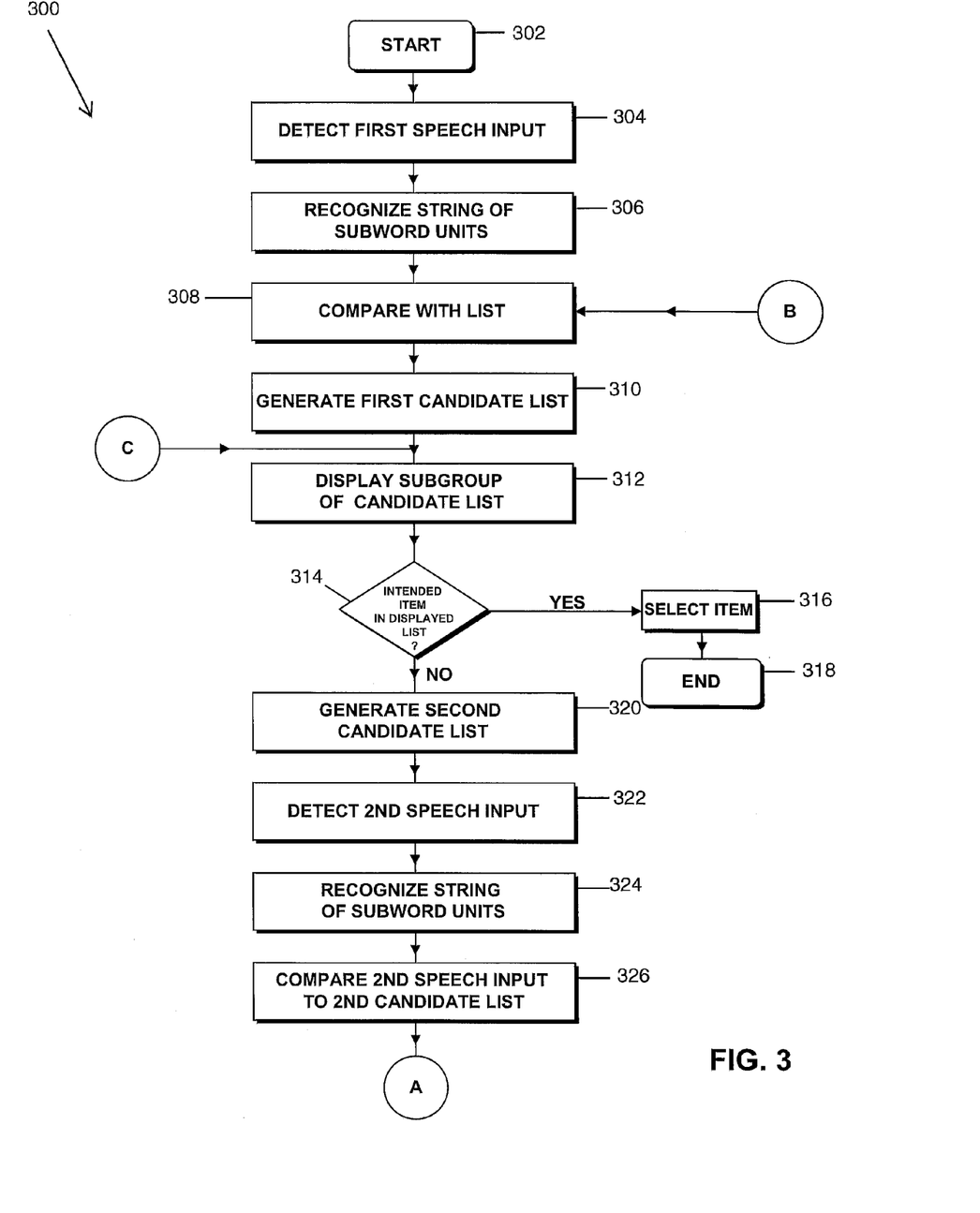
FIG. 3 is a flow diagram illustrating one example of one method for optimizing the selection of an item utilizing speech input.
Figure 4:
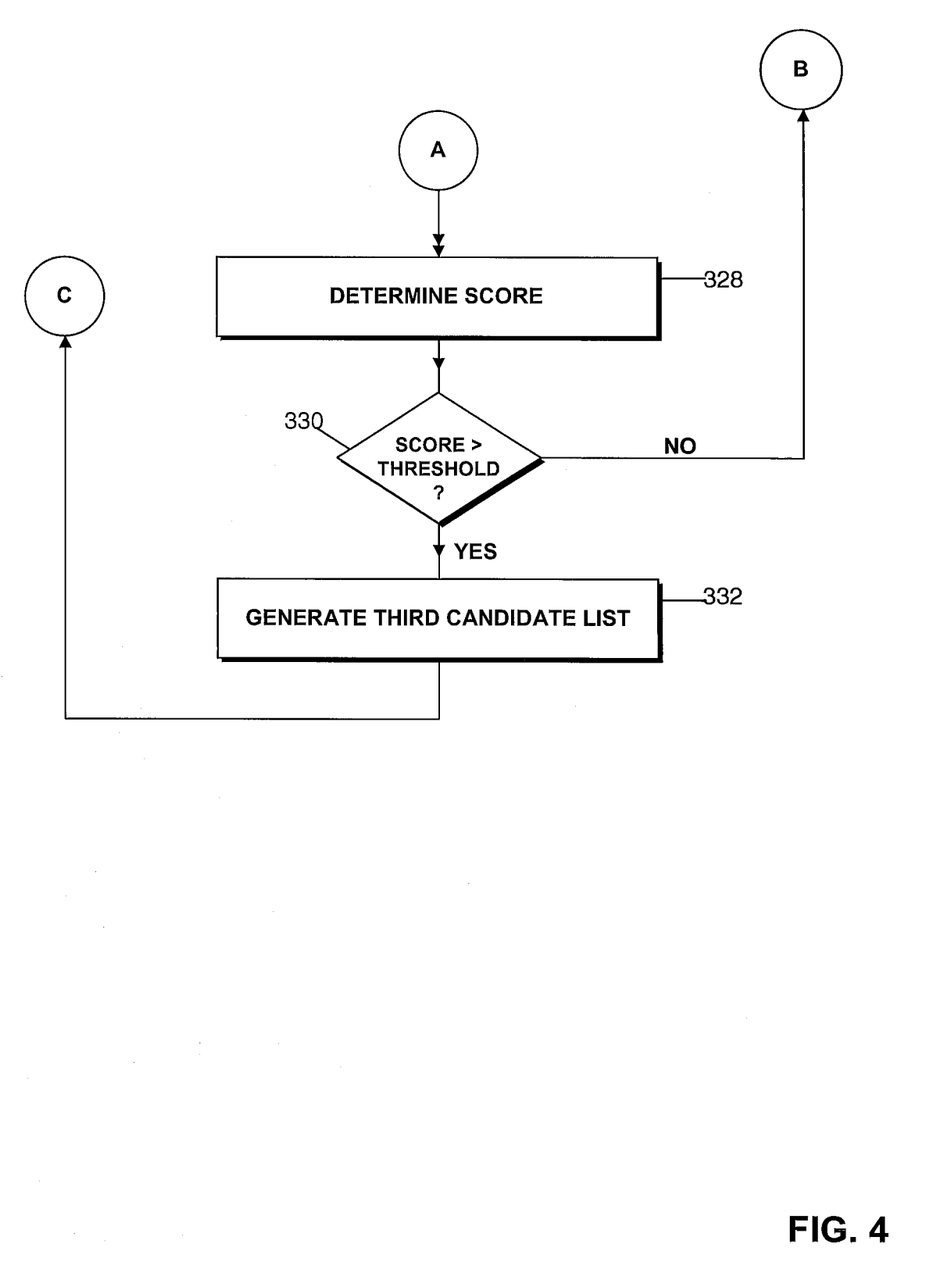
FIG. 4 is a continuation of the flow diagram in FIG. 3 illustrating one example of one method for optimizing the selection of an item utilizing speech input.

FIG. 3 is a flow diagram illustrating one example of one method 300 for optimizing the selection of an item utilize speech input. FIG. 4 is a continuation of the flow diagram in FIG. 3. Accordingly, FIGS. 3 and 4 together illustrate one example of a method 300 for carrying out the speech recognition described above utilizing minimum computing resources.

In the illustrated example, the method 300 starts in step 302. In step 304, the first speech input is detected and recorded. In step 306, a string of subword units is recognized for said first speech input, this string of subword units includes a phonetic transcription of the speech input. This phonetic transcription is then compared in step 308 with the transcription of the items in list 102 (FIGS. 1 & 2) and a first candidate list is generated in steps 310 by selecting the best matching items. As discussed in connection with FIG. 2, the first candidate list can contain several hundreds of items, but will contain less items than the large list 102. In the first candidate list, it is now determined which, among the items of the candidate list, best matches the speech input. The items having the highest similarity can be displayed as a first subgroup in step 312. In step 314, it is then asked whether the intended item is displayed in the list. When the speaker selects one of the displayed items as the selected item, the speaker then confirms the selection, the selection being shown in step 316. In this example, the method ends in step 318. It may, however, happen that the intended item was not included in the list presented to the speaker. In this case, a new list, the second candidate list, can be generated on the basis of the first candidate list by removing the m discarded items in step 320. Furthermore, a second speech input is detected in step 322 and the string of subword units is recognized for the second speech input in step 324. Instead of comparing this string of subword units of the second speech input to the complete list, in step 326, the former is compared to the second candidate list generated in step 320. During the comparison step 326, a measure is also determined in step 328 (FIG. 4), the score representing how well the second candidate list corresponds to the string of subword units from the second speech input. It may happen that the user, in connection with his first speech input has unintentionally uttered a wrong word. In this case, the second speech input may be completely different to the first speech input. Accordingly, the risk exists that the intended item is not included in the first candidate list which forms the basis also for the second candidate list. If the score determined in step 328 is lower than a threshold value as determine in step 330, the second speech input is compared with the complete list by returning to step 308 as shown in FIG. 3.

When it is determined in step 330 that the score is larger than the predetermined threshold, the speaker has most likely uttered the same word twice. In this case, the second speech input is compared to the second candidate list to determine the best matching results so that the third candidate list 214 (FIG. 2) is generated in step 332. The system then returns to step 312 where a subgroup of the third candidate list can be displayed to the user. Then, the steps 314 to 330 are reiterated. As shown in connection with FIGS. 3 and 4, the method can be reiterated as long as the intended item is finally included in the list of items presented to the user.

The above description shows that, also when the first speech input was not recognized, a second speech input can be processed with low computational effort by taking into account the results of the first speech recognition.

In operations, the speech recognition method described in FIGS. 3 and 4 for selecting, via a speech input, an item from a list of items includes the step of first detecting a first speech input. Then, a recognition step for the detected speech input is carried out. The recognized speech input is then used for comparing the latter with the list of items, and a first candidate list of best matching items is then generated based on the comparison result. After the first candidate list of best matching items is generated, at least one of said best matching items of said first candidate list is presented to the speaker so that the speaker can select an item from the list of presented items. If the item that the speaker wanted to select is not obtained in the items presented to the speaker, a second speech input is then detected and is again recognized. A second candidate list of best matching items is then generated on the basis of the first candidate list. The second candidate list of best matching items is built on the basis of the comparison result obtained in connection with the first speech input. When the second speech input is applied to the first candidate list or a subset thereof, the computational effort for recognizing the best matching items is minimized, as the second speech input is not applied to the large list of items.

By way of example, in case of a speech-controlled selection of a destination location in a navigation system, a country such as Germany may have about 70,000 city names. The first candidate list or a subset of such list that includes the best matching results of the comparison of the recognized first speech input to the list of items, normally contains a much smaller number of entries, such as a number between 500 and 2000. When the second speech input is applied taking into account the result of the first speech input, the computational time to calculate a new list of best matching items is minimized.

In one implementation, the recognition step may be carried out by recognizing a string of subword units for the first speech input and by comparing the recognized string of subword units with subword unit transcriptions of the list of items. Additionally, a second candidate list may be generated by comparing the string of subword units for the second speech input to a list of transcriptions that is a sublist of the first candidate list.

In the recognition step of recognizing the string of subword units for the speech input, a first path of speech recognition for determining a string of subword units that best matches the speed input is performed. In this step, any sequence of subword units without any restriction may be recognized. Thus, in this step, the recognition is independent of the items of the large list and their phonetic transcriptions and requires only little computational effort. According to a high probability, the speaker utters the same word a second time. When the second candidate list of best matching items for the second speech input is calculated on the basis of the first speech input, the recognition steps can be carried out much faster and more reliably, as the first candidate list obtained in connection with the first speech input probably comprises the intended item. Normally, only a small number of this first candidate list is presented to the speaker for further selections, e.g., a number between 3 and 10, or around 5 out of 500-2000 items are presented to the speaker.

If the first speech input was recorded in a noisy environment, it may happen that the intended item is not within these first 5 best matching items presented to the user; however, there is a high probability that this intended item is included in the first candidate list. The subgroups of items can be presented to the speaker either by displaying them on a display or by reading the claims to the speaker, e.g., with the use of a text-to-speech engine, which may be the information unit 110.

The second candidate list may now be generated by comparing the string of subword units for the second speech input to a list of transcriptions that is based on the first candidate list. In this regard, the system does not have to go back to the complete list so that additional computational time is avoided. When the second candidate list is generated, the best matching items of the first candidate list presented to the speaker, and which were discarded by the speaker, are subtracted from the first candidate list, before the string of subword units for the second speech input is applied to the second candidate list. Accordingly, the second candidate list corresponds to the first candidate list from which the items presented to the user and which did not meet the user's agreement, are omitted. This further helps to reduce the list of possible best matching items and helps to avoid the selection of items that sound very similar to the intended item.

The string of subword units for the second speech input can then be compared to the second candidate list and the list of best matching items can be generated based on the comparison result, which will be called a third candidate list. Again, the best results of this third candidate list can be displayed to the user, or may be output to the user orally by a text to speech engine so that the user can now select from this new short list of presented items.

According to one implementation, a subword unit corresponds to a phoneme or a syllable of a language or any other units such as larger groups of phonemes, or smaller groups such as demiphonemes. In this case, the subword unit recognition is a phoneme/syllable recognition that determines a sequence of phonemes or syllables that best matches the speech input. However, the possible sequence of subword units for recognition of the first and second speech input is not restricted by the vocabulary of the application such as the phoneme transcriptions of the list of items comprising the phoneme transcriptions of cities, artists or the name of a piece of music. Thus, the phoneme recognizer applied in the first recognition step may generate a phoneme sequence that does not perfectly match any phoneme transcription of the list. The first candidate list of the best matching items may therefore be considered simply as a lead to items having a relatively high likelihood of appearance for a given acoustic speech input. These items are then offered to a second speech recognition step for further comparing with the speech input. However, the invention is not restricted to a speech recognition on a phoneme or subword unit basis. The invention can be used in connection with any speech recognition method recognizing a speech input.

When a subgroup of the list of best matching items is presented to the speaker and the intended item was not contained in the presented list, the reason therefore can also be that the speaker uttered a wrong name in the first speech input. Furthermore, a very strong noise could have been present during the recording of this first speech input. In this case, the second speech input and the recognized string of subword units for the second speech input will differ considerably from the first speech input and the corresponding recognized string of subword units. Thus, it may happen that the intended item is not comprised in the first, second or third candidate list respectively. To consider this situation, the recognized second speech input can be compared to the second or third candidate list and a score is determined representing a measure how well the second speech input fits the candidate list. If the second speech input does not correspond at all to the items listed in the second or third candidate list, there is a high likelihood that the intended item is not comprised in the candidate list. In this case, when the highest obtained score is lower than a predetermined threshold, the second speech input is compared to the complete list of items. In this case, the system has to go back to the large list of items containing all entries. From this complete list of items, the items already discarded by the speaker from the first candidate list can be removed to avoid that these items are again kept in the candidate list of best matching items. As already mentioned in the introductory part of the description, the above-described method can be used for the selection of any item from a large list of items such as the selection for a proper name, of a destination location such as a city or village, for selecting an artist out of a group of artists or for selecting a media file out of a large group of media files.

Further, the string of subword units for the second speech input is compared to the second candidate list and this score determines how well the string of subword units for the second speech input fits the subword unit transcriptions of the candidate list. In one implementation, when the highest score is lower than the predetermined threshold, the string of subword units for the second speech input is compared to the subword unit transcriptions of the complete list of items.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIGS. 1 & 2. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" and/or "signal-bearing medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented speech recognition method for selecting, via a speech input, an intended item from a list of items, wherein the list of items includes items containing one or more words, the computer-implemented method comprising the following steps in association with a processor:
   detecting a first speech input;
   in a first computer process, recognizing the first speech input producing a first recognition result;
   in a second computer process, comparing the first recognition result with the list of items and generating a first candidate list of best matching items based on the comparison result, the first candidate list containing a plurality of items and the first candidate list being a subset of the list of items;
   presenting to the speaker at least one of the best matching items of the first candidate list for a selection of an item by the speaker, and if the intended item is not one of said best matching items presented to the speaker:
   detecting a second speech input;
   in a third computer process, recognizing the second speech input producing a second recognition result; and
   in a fourth computer process, generating a second candidate list of best matching items matched to the second recognition result, the second candidate list being a subset of the first candidate list, and
   in a fifth computer process, determining a score for each member of the second candidate list, each score being a measure of how well the second speech input corresponds to a respective member of the second candidate list, wherein when each of the determined scores is lower than a threshold value, the second speech input is compared to the complete list of items.

2. The speech recognition method of claim 1, where the second candidate list is generated by comparing the second recognition result to a sublist of the first candidate list.

3. The speech recognition method of claim 1, where the second candidate list is generated by subtracting the at least one of the best matching items of the first candidate list presented to the speaker from the first candidate list.

4. The speech recognition method of claim 3, where the second recognition result is compared to the second candidate list and a third candidate list of best matching items is generated based on the comparison result.

5. The speech recognition method of claim 4, where the N best results of the third candidate list are selected and presented to the speaker.

6. The speech recognition method of claim 4, further comprising comparing the second recognition result to the third candidate list and determining a score for each item of the third candidate list representing a measure of how well the second speech input fits to the items of the third candidate list.

7. The speech recognition method of claim 6, where, when the highest score of the third candidate list is lower than a predetermined threshold, the second speech input is compared to the complete list of items.

8. The speech recognition method of claim 6, further comprising:

receiving from the speaker an indication signal discarding the at least one of the best matching items of the first candidate list; and removing the discarded items from the first candidate list; where, when the highest score is lower than a predetermined threshold, the second recognition result is compared to the complete list of items with the items identified by the indication signal removed.

9. The speech recognition method of claim 1, where for recognizing the first and second speech input, a string of subword units for each speech input is generated, which is a recognition result, the string of subword units being compared with subword unit transcriptions of the list of items to identify matches, the matches resulting in the first and second candidate list, respectively.

10. The speech recognition method of claim 9, where the string of subword units for the second speech input is compared to the second candidate list resulting in a score, the score representing a measure of how well the string of subword units fits the subword unit transcriptions of the candidate list.

11. The speech recognition method of claim 4, where from the first and third candidate lists the best M results of the best matching items are displayed to the speaker for further selection, the speaker either selecting one of the displayed items or discarding all of the displayed items.

12. The speech recognition method of claim 1, where the speech input is used for selecting a destination location for a vehicle by a speech command or for selecting a media file out of a group of media files.

13. A speech recognition system for selecting, via a speech input, an intended item from a list of items, the system comprising:

a database containing a list of items stored in tangible non-transitory memory, the list of items having items containing one or more words;

a speech recognition module configured to recognize a first speech input resulting in a first recognition result, the speech recognition module including circuitry;

a comparing module configured to compare the first recognition result to the list of items and generating a first candidate list of best matching items based on the comparison result, the first candidate list containing a plurality of items and being a subset of the list of items;

an information unit configured to present to the speaker at least one of the best matching items of the first candidate list for a selection of an item by the speaker, and a score determining unit, the system being configured so that if the intended item is not one of said best matching items presented to the speaker:

the speech recognition module recognizes a second speech input resulting in a second recognition result, the comparing module generates a second candidate list of best matching items by comparing the second recognition result to the first candidate list, and the score determining unit determines a score for each member of the second candidate list, each score being a measure of how well the second speech input corresponds to a respective member of the second candidate list, wherein when each of the determined scores is lower than a threshold value, the score comparison unit compares the second speech input to the list of items in the database.

14. The speech recognition system of claim 13, where the information unit comprises a display on which a subgroup from one of the first and second candidate lists is displayed.

15. The speech recognition system of claim 13, where the comparing module generates the second candidate list by subtracting the group of best matching items displayed, from the first candidate list.

16. The speech recognition system of claim 15, where the comparing module generates a third candidate list by comparing the second recognition result to the second candidate list.

17. The speech recognition system of claim 13 where the database contains subword unit transcriptions for each item.

* * * * *